United States Patent
Sinha et al.

(10) Patent No.: US 8,537,982 B2
(45) Date of Patent: Sep. 17, 2013

(54) SYSTEM FOR SYNCHRONIZING TELEPHONES AND ELECTRONIC DISPLAYS

(75) Inventors: Anoop Kumar Sinha, Palo Alto, CA (US); David Wanqian Liu, South San Francisco, CA (US)

(73) Assignee: RMG Networks, Inc., San Francsisco, CA (US)

( * ) Notice: Subject to any disclaimer, the term of this patent is extended or adjusted under 35 U.S.C. 154(b) by 1210 days.

(21) Appl. No.: 12/106,880

(22) Filed: Apr. 21, 2008

(65) Prior Publication Data
US 2008/0260115 A1    Oct. 23, 2008

Related U.S. Application Data

(60) Provisional application No. 60/913,016, filed on Apr. 20, 2007.

(51) Int. Cl.
*H04M 1/64* (2006.01)

(52) U.S. Cl.
USPC .................................... 379/88.13; 379/88.17

(58) Field of Classification Search
USPC .................... 725/122, 77; 348/8; 379/88.22; 455/412; 709/231
See application file for complete search history.

(56) References Cited

U.S. PATENT DOCUMENTS

| 5,966,652 A * | 10/1999 | Coad et al. ................. 455/412.1 |
| 5,973,722 A * | 10/1999 | Wakai et al. ..................... 725/76 |
| 6,683,941 B2 * | 1/2004 | Brown et al. ............... 379/88.22 |
| 7,114,171 B2 * | 9/2006 | Brady et al. ..................... 725/77 |
| 7,412,533 B1 * | 8/2008 | Johnson et al. ............... 709/231 |
| 7,454,776 B1 * | 11/2008 | Walker et al. ................. 725/122 |
| 2005/0278754 A1 * | 12/2005 | Bleacher et al. ................ 725/77 |

* cited by examiner

*Primary Examiner* — Mohammad Islam
*Assistant Examiner* — Van D Huynh
(74) *Attorney, Agent, or Firm* — Perkins Coie LLP; Michael A. Glenn (57) ABSTRACT

A content server delivers video segments to various on-site modules for display at the respective on-site modules according to respective schedules. The on-site modules may, for example, be located in coffee shops, convenience stores, sandwich grottos, and other establishments where customers are known to wait in line. The on-site modules also display call-in instructions, including a telephone number and a code. When a user places a call to a designated number and enters the code, an audio server determines the state of progression of the video, and begins synchronized audio playback over the caller's telephone.

9 Claims, 6 Drawing Sheets

| ENTRY CODE (702) | START TIME (704) | AUDIO SEGMENT (706) |
|---|---|---|
| 12345 | 09:30 | HONDA ADVERTISEMENT |
| 12345 | 09:32 | TRIVIA GAME |
| 12345 | 09:34 | SOUNDGARDEN VIDEO |
| ... | ... | .... |
| 93431 | 09:30 | PUBLIC SERVICE ANN. |
| 93431 | 09:33 | PUBLIC RADIO SPOT |
| 93431 | 09:34 | TALKING HEADS VIDEO |
| 93431 | 09:44 | CELEBRITY INTERVIEW |
| ... | ... | ... |
| 22846 | 09:30 | SUBWAY ADVERTISEMENT |
| 22846 | 09:31 | THIS DAY IN HISTORY |
| 22846 | 09:34 | TECH REVIEWS BY CNET |

```
                                                        getwavexml[1]
<vxml version="2.1">
<script>
function waitting_time(clip_play_time)
{
//1274
  return clip_play_time-get_current_time
}
function get_current_time()
{
  var d = new Date();
  var myHour = d.getUTCHours();
  var myMinutes = d.getUTCMinutes();
  var mySeconds = d.getUTCSeconds();
  var current = 60*60*myHour;
  var current = current+ 60*myMinutes;
  var current = current + mySeconds;
  return current;
}
</script>
<form id="main">
<!-- enable bargein for this dialog -->
<property name="bargein" value="true"/>
<block>
<prompt>
<voice name="mike"> danoo </voice>
<break timeexpr="waitting_time(1354) + '000ms'" />
</prompt>
<audio src="http://f01.sjc.danoo.tv/file/1148.snd"></audio>
<audio src="http://f01.sjc.danoo.tv/file/1111.snd"></audio>
<audio src="http://f02.sjc.danoo.tv/file/1108.snd"></audio>
<audio src="http://f01.sjc.danoo.tv/file/1113.snd"></audio>
<audio src="http://f02.sjc.danoo.tv/file/1054.snd"></audio>
<audio src="http://f01.sjc.danoo.tv/file/1166.snd"></audio>
<audio src="http://f02.sjc.danoo.tv/file/1058.snd"></audio>
<audio src="http://f01.sjc.danoo.tv/file/1005.snd"></audio>
</block></form></vxml>
```

FIG. 8

SYSTEM FOR SYNCHRONIZING TELEPHONES AND ELECTRONIC DISPLAYS

CROSS-REFERENCE TO RELATED APPLICATIONS

This application claims the benefit of the following earlier-filed U.S. Provisional Application in accordance 35 USC 119 (provisional application): Application No. 60/913,016, filed on Apr. 20, 2007 in the names of Sinha and Liu. The entirety of the foregoing application is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to the delivery of digital video and audio content to remote locations. More particularly, the invention concerns a system where a user, upon seeing a video segment being played at one of various on-site modules, places a telephone call to a designated number to begin listening to audio synchronized with the video underway at that particular on-site module.

2. Description of the Related Art

The availability of digital entertainment today is more widespread than ever. The market abounds with different offerings, such as cable television, HD television, DVD rentals, movie downloads, pay-per-view, and many more. Despite these offerings, and new products and services that arise all the time, the public has an insatiable desire for digital entertainment products that are new, portable, convenient, and just plain fun. By the same token, advertisers are continually seeking ways to open new markets and reach different customers, or to reach them in a different way.

Despite the demonstrated success of various products already in the marketplace, there is a steady desire for further development in this area.

SUMMARY OF THE INVENTION

A content server delivers video segments to various on-site modules for display at the respective on-site modules according to respective schedules. The on-site modules may, for example, be located in coffee shops, convenience stores, sandwich grottos, and other establishments where customers are known to wait in line. The on-site modules also display call-in instructions, including a telephone number and a code. When a user places a call to a designated number and enters the code, an audio server determines the state of progression of the video, and begins synchronized audio playback over the caller's telephone.

The teachings of this disclosure may be implemented as a method, apparatus, logic circuit, storage medium, or a combination of these. This disclosure provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings.

Hardware Components & Interconnections

Overall Structure

Figure 1:
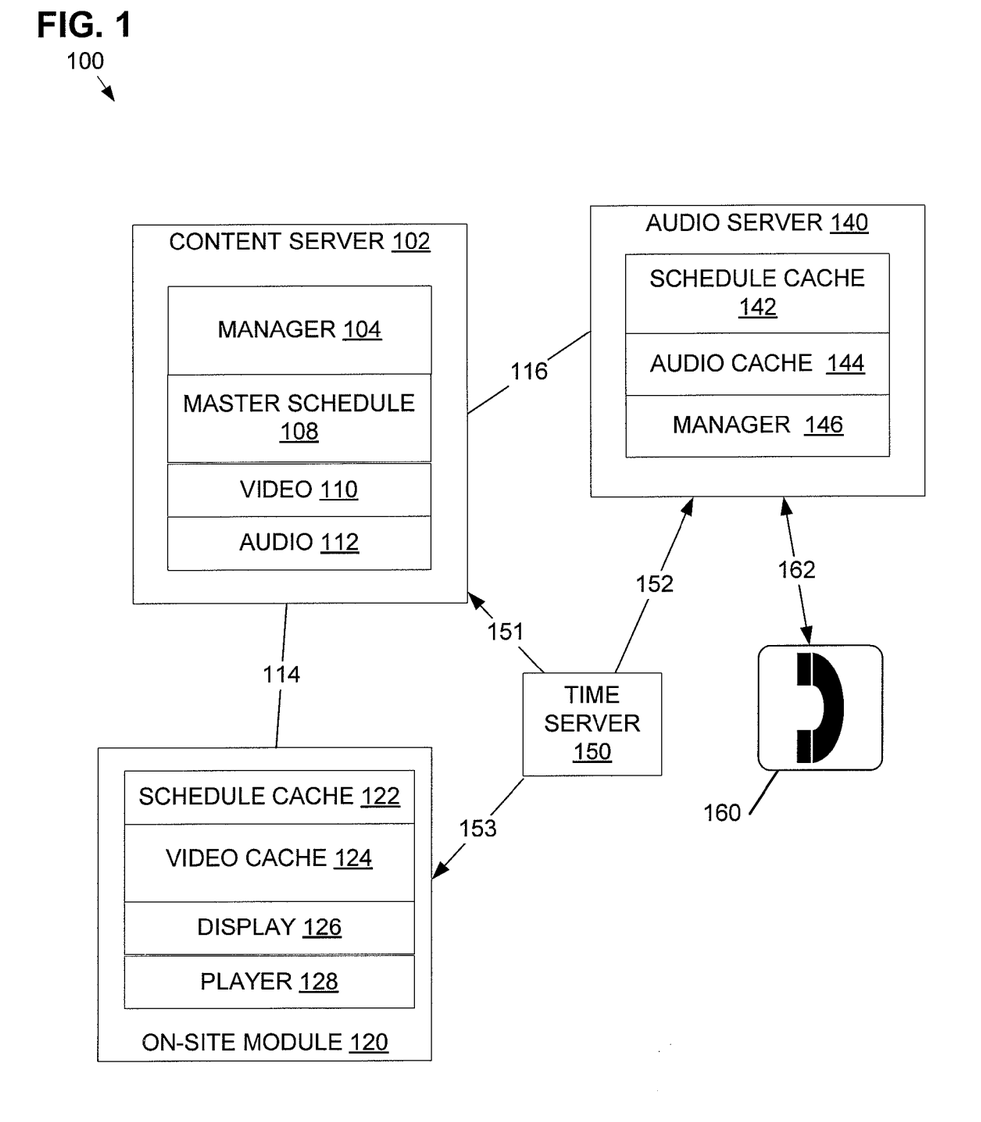
FIG. 1 is a system block diagram.

FIG. 1 shows a multimedia delivery system 100. Broadly, a content server 102 delivers stored multimedia content to various on-site modules 120 at various distributed geographic sites. The on-site modules 120 display video segments from the server 102 according to respective schedules. The on-site modules may, for example, be located in coffee shops, convenience stores, bars, cafes, delis, airports, and other establishments where customers are known to wait in line.

Each of the on-site modules 120 also displays call-in instructions including a telephone number and a given entry code. When a user places a call to the number, and enters the code, the audio server 140 determines the state of progression of the video, and begins synchronized audio playback over the caller's telephone 160.

As for the telephones 160, the use of cell phones will probably provide the most convenient alternative for most users. However, people could also employ radio phones, computers, VOIP phones, landline phones, or any other device that is capable of placing calls to telephone numbers.

Content Server

Referring to FIG. 1, the content server 102 may be implemented by a personal computer, computer workstation, mainframe computer, or any other computing platform with resources sufficient for the purposes described herein. More broadly stated, the server 102 may be implemented by one or more hardware devices, software devices, a portion of one or more hardware or software devices, or a combination of the foregoing. Some examples are described in greater detail below, in the discussion of FIGS. 2-4.

In the present example, the server 102 includes one or more processing components, exemplified by a manager 104 which directs operations of the content server 102. The operation of the manager 104 is discussed in detail below under the heading "Operation."

In the present example, the components 108, 110, 112 are embodied by digital data stored on a mass storage device such as an array of magnetic hard disk drives. Various other storage choices are outlined later in this discussion, beneath the heading "Storage Media."

Video 110 provides a stored repository of video segments, and similarly, the audio 112 provides a stored repository of audio segments. In one example, the video segments are stored in a multimedia file format such as MPEG, MPEG-2, MPEG-4, WMV, MOV, AVI, or another format appropriate to the operations discussed herein. The audio segments are stored in an audio file format such as WAV, AIFF, AU, WMA, MP3, AAC, MP2, MP3, MP4, RA, etc. Each video segment may have one or several audio segments. Video and audio segments may be bundled together, or provided as separate files.

The master schedule 108 prescribes which video segments (from 110) are scheduled for being played at which on-site module 120, and at which times. There are many on-site modules 120, even though only one is shown for the sake of brevity. Thus, the schedule 108 indicates, for each on-site module 120, which video segment will be playing at any given moment, and the video segment's planned start and stop times. The schedule 108 also indicates which audio segment(s) correspond to each video segment. The master schedule 108, or other metadata, further indicates a destination address for each of the on-site modules 120 and the audio server 140, so that the content server 102 can send data to these components.

The server 102 is coupled to the modules 120 by respective links such as 114. Likewise, the server 102 is coupled to the audio server 140 by a link 116. The links 114, 116 may be embodied by various hardware and protocols, with some examples including Internet, Intranet, Ethernet, telephone lines, DSL, ISDN, wireless, satellite, etc.

On-Site Module

FIG. 1 depicts a single on-site module 120 for ease of illustration, but the system 100 is expected to include many on-site modules. The module 120 may be implemented by a personal computer, computer workstation, mainframe computer, or any other computing platform with resources sufficient for the purposes described herein. A personal computer will probably sufficient in most cases. More broadly stated, the module 120 may be implemented by one or more hardware devices, software devices, a portion of one or more hardware or software devices, or a combination of the foregoing. Some examples are described in greater detail below, in the discussion of FIGS. 2-4.

The module 120 includes a schedule cache 112 for storing part of the master schedule 108 that pertains to the particular module 120, or with some penalty in download time and storage space, the entire master schedule 108. This schedule sets the timing of playing video segments. The module 120 also includes a video cache 124 for storing the video segments received from the content server 102. In the event video is bundled with audio, the cache 124 stores the bundled audio/video segments. As one example, the storage components 122, 124 may be implemented by mass storage devices such as an magnetic hard disk drives. Various other storage choices are outlined later in this discussion, beneath the heading "Storage Media."

The display 126 includes one or more flat panel LCD screens, CRTs, plasma screens, projectors, or other suitable video monitor for displaying human-readable text and video. A video array may be used, if desired. The player 128 comprises a processing engine that "plays" the video segments stored in the video cache 124 in order to display video content on the display 126. Although the module 120 may be capable of playing sound corresponding to the video segments being played, the idea is for the system 100 to render sound to customers on demand, when the customers call-in to listen to a sound track over their telephones. Therefore, the module 120 may be provided without sound card, speakers, and related audio equipment. Or, operators may mute the volume or turn the volume down. The operation of the player 128 is discussed in detail below under the heading "Operation."

In one embodiment, all components of each on-site module 120 are located together. In another embodiment, the display 126 is located at the desired venue, but the remaining hardware is located remotely and connected to the display by appropriate wired or wireless links.

Audio Server

Still referring to FIG. 1, the audio server 140 may be implemented by a personal computer, computer workstation, mainframe computer, or any other computing platform with resources sufficient for the purposes described herein. A personal computer will probably sufficient in most cases. More broadly stated, the module 120 may be implemented by one or more hardware devices, software devices, a portion of one or more hardware or software devices, or a combination of the foregoing. Some examples are described in greater detail below, in the discussion of FIGS. 2-4.

The audio server 140 includes a schedule cache 142 storing some (or all) of the master schedule 108. An audio cache 144 stores some or all of the audio segments from the content server 102. As one example, the storage components 142, 144 may be implemented by mass storage devices such as magnetic hard disk drives. Various other storage choices are outlined later in this discussion, beneath the heading "Storage Media."

Figure 7:
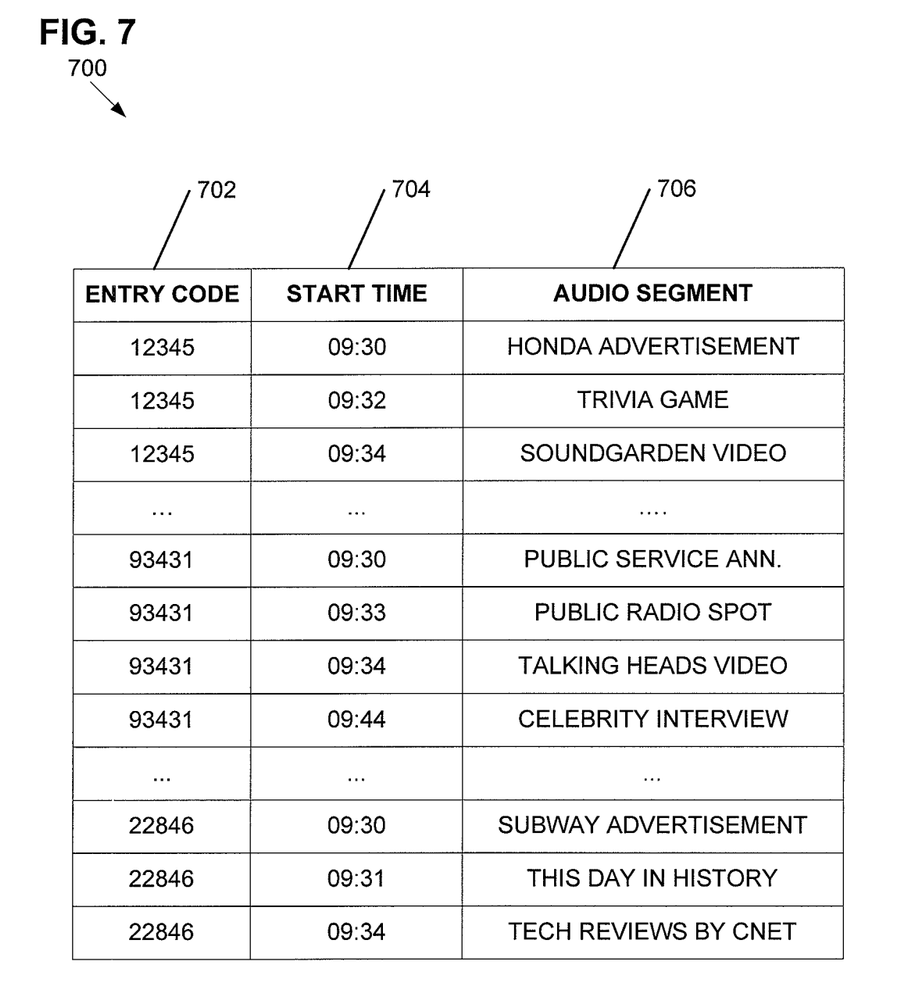
FIG. 7 is a diagram showing a schedule at the audio server.

As mentioned above, the server 140 caches a complete or excerpted local copy (142) of the master schedule 108. The copy (142) at the audio server 140 might not need to include all information on the video segments, for instance. FIG. 7 shows excerpted copy of the master schedule 108 in the form of a table 700. The entry codes 702 identify the different on-site modules 120 where, in this example, each on-site module uses a different entry code. The start times 704 indicate when a video is scheduled (by the master schedule 108) to start playing at the corresponding on-site module 120. The audio segment column 706 identifies the audio segment scheduled to play at the given on-site module (702) at the given time (704). The entries in FIG. 7 are played back-to-back, which is one example, but there may be a planned delay between adjacent video segments.

As an alternative to this embodiment, several on-site modules may share the same entry code. For example, the on-site modules in every JAVA JAZZ™ Coffee store may be programmed to play identical content. In this embodiment, the entry code 702 does not necessarily identify an individual on-site module. Here, the table 700 may include another column with a unique identifier for each on-site module, or this may be omitted.

At the audio server, a manager 146 coordinates receipt of the master schedule 108 and audio segments 112 from the content server 102. The manager 146 also opens connections 162 with calling telephones 160, and supervises receipt and verification of caller-submitted entry codes. Further, the manager 146 identifies, synchronizes, and delivers the appropriate audio content to each caller over the corresponding telephone connection 162. To serve the foregoing functions, the manager includes an audio server component, which in one example is implemented by a VoiceXML platform such as AUDIO GENIE™, TELL ME™, or another such product. The operation of the manager 146 is discussed in detail below under the heading "Operation."

One important aspect of the audio server 140 is that viewers at the various on-site modules contact the audio server 140 by telephones 160 and telephone links 162. Of course, the telephones 160 and links 162 may use a variety of implementations from telephone to computer and everything in between, as discussed above. However, the audio server 140 in all cases is reachable by a "telephone number." A telephone number, in a broad sense, is a code that contains all information necessary to uniquely identify intended endpoints for a call under the public switched telephone network. Therefore, the audio server 140 is fully reachable to users with a cell phone or VOIP phone or whichever calling instrument, by dialing a normal telephone number.

As an alternative to the foregoing arrangement, the audio server 140 may be consolidated within the content server 102, in which case the separate caches 142, 144 may be omitted. Another alternative is that, instead of locally storing the audio segments in 144, the server 140 may retrieve these from the server 102 on demand and render them to callers with minimal delay after any necessary buffering.

Time Server

The system 100 utilizes one or more time servers 150 in order to synchronize the time across all units 102, 120, 140. One example of the time server 150 is an Internet time server. The U.S. government and many others operate various Internet time servers, for example, under programs administered by the National Institute of Standards and Technology. Other examples include MICROSOFT™, APPLE™, and Greenwich time servers.

The components 102, 120, 140 connect to the time server 150 links 151-153 that are appropriate to the nature of the server 150. With an Internet server 150, for example, the links 151-153 are satisfied by Internet connections. In this example, the components 102, 122 120, 140, 150 utilize Network Time Protocol.

Instead of an Internet time server, the system 100 may use various other synchronization schemes, such as utilizing GPS receivers, or using very accurate and reliable (even redundant) local clocks with battery backup, or using other products suitable for the purposes of this disclosure.

In one embodiment, any transfer latencies of the links 114, 116, 162 are assumed to be negligible. In another embodiment, the system 100 employs software and or hardware to measure, estimate, predict, and/or accommodate for network transfer latencies in order to assure that audio content as delivered to a telephones 160 is synchronized with video content displayed at the corresponding module 120.

Exemplary Digital Data Processing Apparatus

As mentioned above, data processing entities may be implemented in various forms. These entities include, for example, the server 102, manager 104, server 140, manager 146, module 120, player 128, etc.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
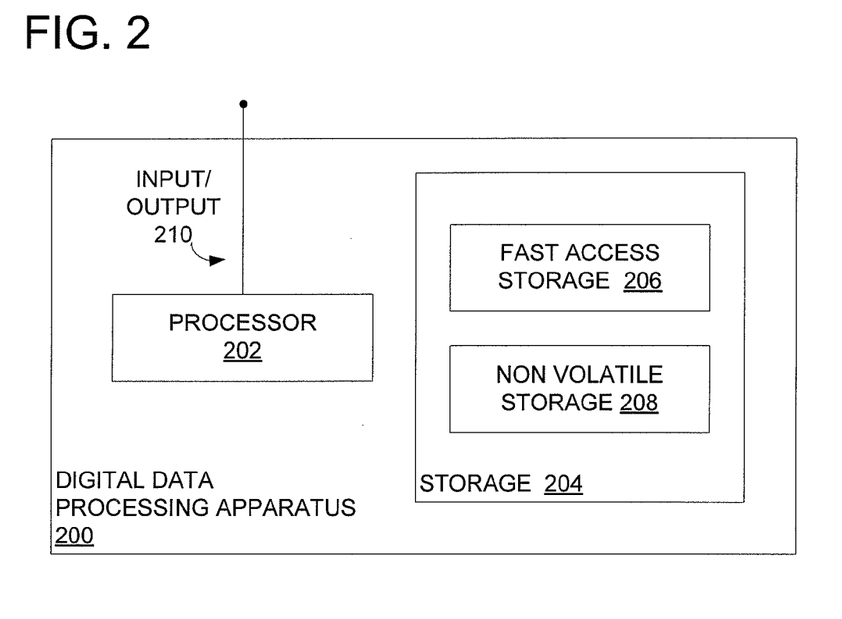
FIG. 2 is a block diagram of a digital data processing machine.

As a more specific example, FIG. 2 shows a digital data processing apparatus 200. The apparatus 200 includes a processor 202, such as a microprocessor, personal computer, workstation, controller, microcontroller, state machine, or other processing machine, coupled to a digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage is occur in components such as 108, 110, 112, 142, 144, 122, 124 (FIG. 1), as well as storage 204, 208 (FIG. 2). Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

Figure 3:
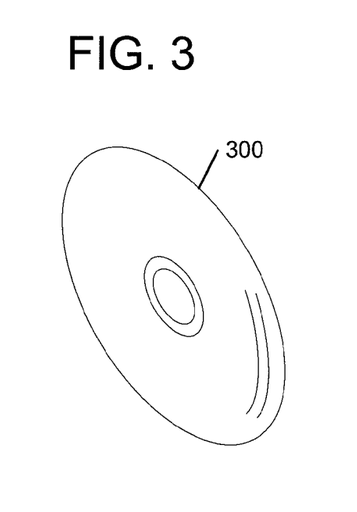
FIG. 3 shows an exemplary storage medium.

In any case, the storage media may be implemented by nearly any mechanism to digitally store machine-readable signals. One example is flash memory. Another example is optical storage such as CD-ROM, WORM, DVD, digital optical tape, or other disk storage 300 (FIG. 3). Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to storage media that contain machine-executable instructions (as described above), a different embodiment uses logic circuitry to implement processing features and data processing entities of the system 100.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
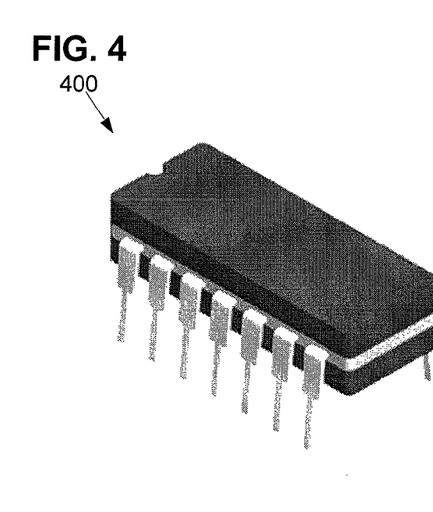
FIG. 4 is a perspective view of exemplary logic circuitry.

FIG. 4 shows an example of logic circuitry in the form of an integrated circuit 400.

Operation

Having described the structural features of the present disclosure, the operational aspect of the disclosure will now be described. The steps of any method, process, or algorithm described in connection with the embodiments disclosed herein may be embodied directly in hardware, in a software module executed by hardware, or in a combination of the two.

Figure 6:
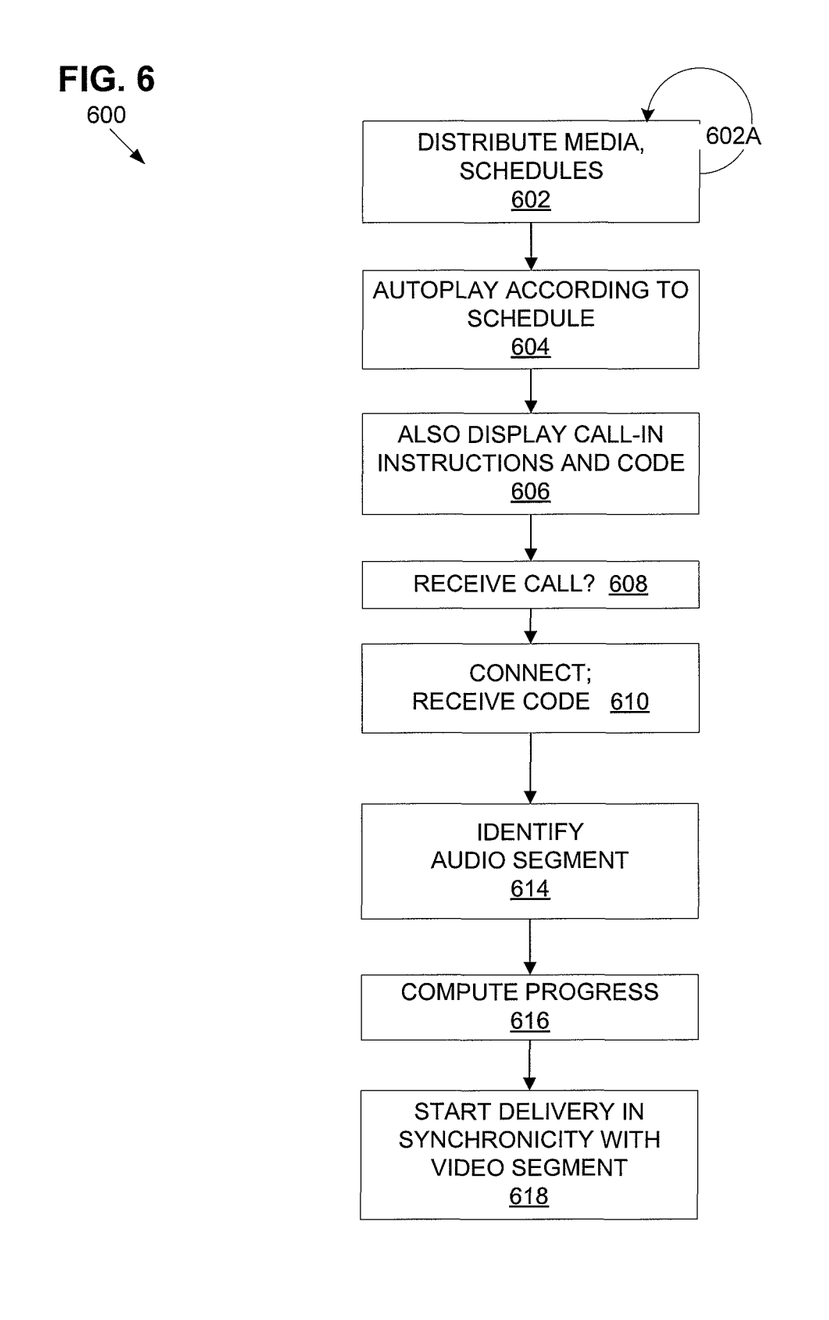
FIG. 6 is a flowchart of a general operating sequence.

FIG. 6 depicts a general operating sequence 600. Without any limitation, these operations 600 are discussed in the context of the hardware and software components from FIG. 1.
Setup Before commencing any of the illustrated steps 600, various preparatory operations are first performed. For example, the content server 102, audio server 140, and on-site module 120 are installed, configured, and initialized.

Further, people select the video and audio segments to be played at the on-site modules, and system administrators or other personnel load the video and audio segments into the storage 110, 112. Various arrangements are possible, but in one example multimedia content is selected by people affiliated with an entity that operates the system 100, or by advertisers or other customers of this entity. In addition to (or instead of) the multimedia content being selected by humans, some or all multimedia content may be selected by machine such as the manager 104.

Also occurring before the sequence 600, people develop the master schedule 108. This involves planning which video segments will play at which on-site modules, and exactly when.
Content Distribution In step 602, the manager 104 distributes video (or bundled video and audio) segments among the various on-site modules 120, and audio segments to the audio server 140. In one example, the manager 104 accesses the schedule 108 to identify the video and audio segments (110, 112) that will air in the next hour (or other time period). The manager 104 then distributes all of these audio segments to the module 120 and server 140. To any given on-site module, the manager 104 limits distribution of video segments to those that will air at the given on-site module in the relevant time period. This time period may be relatively infrequent (planning days in advance) or more frequent (such as matter of minutes). More frequent downloads to the modules 120, 140 permits operators to change the master schedule 108 on-the-fly to deliver real time breaking news, and the like.

The content server 102 may deliver both video and audio segments to the on-site modules 120 if this provides any benefit in terms of efficiency, speed, cost, etc. For example, video and audio segments may be bundled, and it might be easier to send video/audio together. Alternatively, the content server 102 may withhold distribution of audio content to the modules 120. At any rate, playback at the on-site modules 120 is conducted so that the audio portion (if any) is silent, as discussed below.

The module 120 and server 140 process and implement newly arriving media and schedules on a periodic or other regular basis. Another option is for the module 120 and server 140 to process incoming media and schedules automatically upon arrival of the content/schedule. This permits the content server 102 to effectively interrupt and promptly update the schedule in place at the module 120, 140.

Various alternatives as possible as to how many content segments to distribute, and how early before their scheduled airing time. At any rate, to ensure reliability, video and audio content should be fully available at the module 120 and server 140 (respectively) at the scheduled play time. In other words, it is undesirable for video or audio content to be in the process of downloading while playback is occurring.
Auto Play With the on-site modules 120 having received and stored their video segments 124 and schedule 122 in the preceding step, the players 128 automatically begin playing the appropriate video segments on their displays 126 at the scheduled times (step 604). The presentation of video in forms for human understanding is referenced by several terms herein, such as playing, rendering, displaying, presenting, showing, and the like. In addition to the video being played, the players 128 operate their displays 126 to show call-in instructions for viewers to initiate on-demand listening of audio content.

Importantly, the module 120 does not play sound corresponding to the video segments being played. As discussed later, the system only makes sound available to customers on demand. Optionally, the module 120 may play unrelated sound, such as background music, solicitations to call-in to receive audio, etc.

Figure 5:
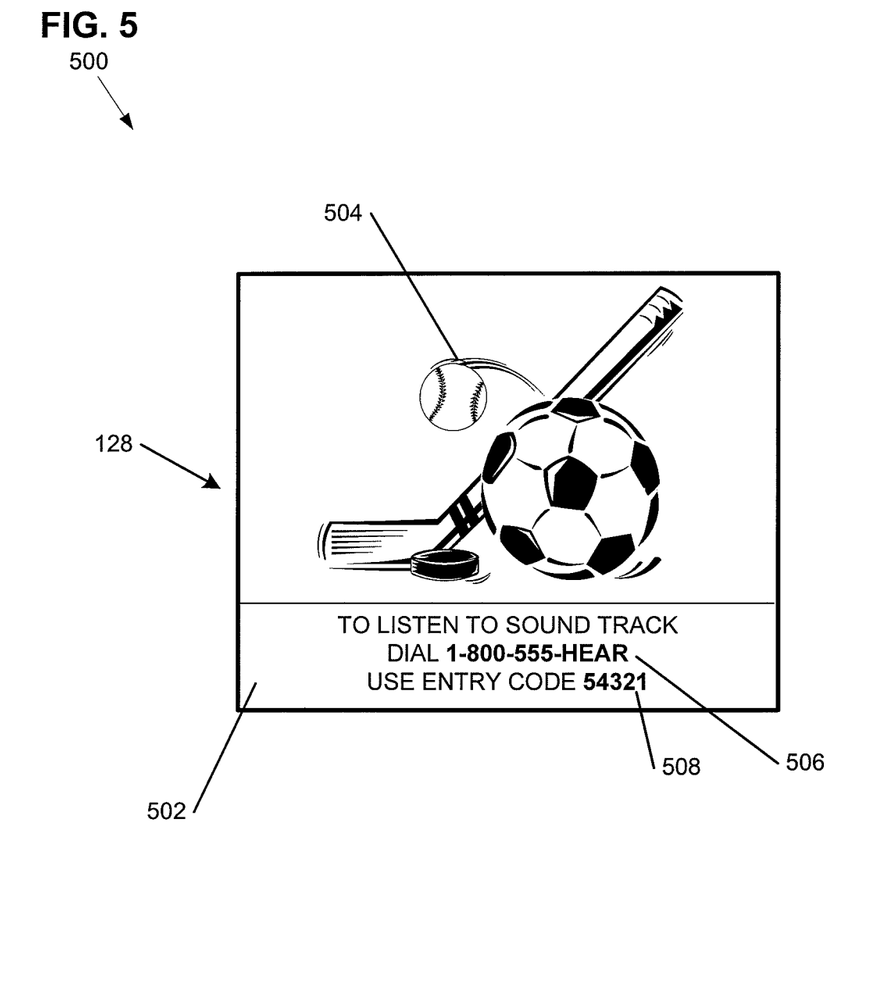
FIG. 5 is a block diagram of a display.

FIG. 5 shows an exemplary display 126, in action according to step 604. The content of the video segment (frozen in time) appears at 504. The call-in instructions appear at 502. In this example, the call-in instructions 502 include a telephone number 506 and an entry code 508. As discussed in greater detail below, viewers dial the number 506 to reach the audio server 140, and thereafter submit the entry code 508 to begin listening to audio matched with the video playing at the that site. Each entry code corresponds to a different on-site module, or multiple modules 120 if they have the same schedule. The system 100 may use a single common telephone number (506) for all on-site modules, or various numbers if different area codes or prefixes are needed. Further, the system 100 could use a different number for each on-site module, in which case the entry code could be omitted.
Call Setup In step 608, the audio server manager 146 receives a viewer's telephone call, placed to the prescribed number 508. The manager 146 answers the call and establishes a telephone connection in step 610. Of course, the audio server 140 may receive many thousands of calls pertaining to an assortment of on-site modules, but for the sake of brevity, the remaining discussion is limited to the details of a single incoming call.

Also in step 610, the manager 146 prompts the caller to submit an entry code. In the present example, the code 508 is an alphanumeric code that the caller enters using his/her telephone keypad. In this case, equipment at the server 140 determines which code was entered. In a different example, the caller may submit a text message containing the entry code to the audio server 140, in which case the audio server 140 places the call to the viewer's telephone (which the manager 146 identifies by the text message or by caller-ID or other service).
Identify Audio Segment In step 614, the manager 146 identifies the appropriate audio segment to be played back to the caller. In the present example, this is performed by indexing the table 700 (stored in 142). Namely, the manager 146 indexes the table 700 by the caller-submitted entry code, and the current time, to determine which audio segment is currently playing. Or, the manager 146 may use the table 700 to determine which video segment is currently playing, and use another list to cross-reference the video segment to the corresponding audio segment.

Optionally, the system may provide multiple audio tracks corresponding to a given video segment. In this case, the server 140 prompts the caller to select the desired soundtrack as part of step 614. In a further enhancement, the server 140 may identifying information (such as caller ID or user-submitted login credential) to retrieve a profile particular to the user, and thereafter adjust playback according to the user's preferences. The profile must have been created during a previous call, or by the user completing an online profile, for example. Some examples of user-adjusted playback include preferred language (such as English, Spanish, etc.), volume of playback, type of narration (male voice, female voice, etc.), welcome back messages, personalized greetings, etc.

In step 616, the manager 146 computes the state of progression of the audio content from the start time. For instance, the manager 146 may take the difference between the current time and the scheduled start time to determine how much of the video has elapsed during playback at the on-site module.

Synchronized Delivery

In step 618, the manager 146 starts to deliver the audio segment identified in step 614 to the caller. This may occur in various ways.

Figure 8:
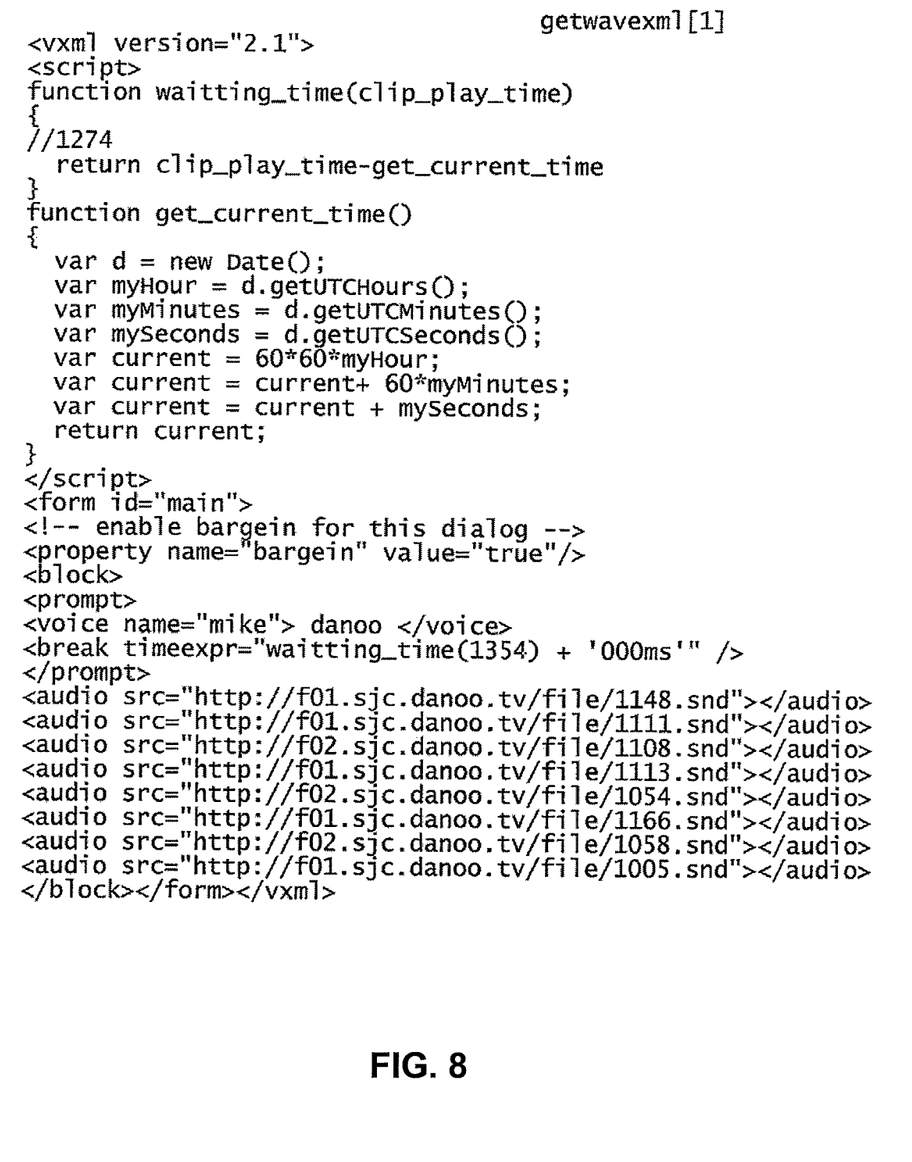
FIG. 8 is an example of some synchronization script.

In one option, if step 616 finds that the corresponding video playback is already in progress (per the schedule 142), then the manager 146 waits until the next planned start time, and begins playing the next scheduled audio segment to the caller at that time. In the mean time, the server 140 may deliver other audio content (unrelated to the video being played at the on-site module), such as radio, music, live programming, a pre-recorded talk show, advertising, etc. FIG. 8 shows an exemplary set of VoiceXML script to implement the foregoing option.

Alternatively, if step 616 finds that video playback is already in progress, then the manager 146 advances the current audio segment to the match the playback state of the video segment, and begins audio playback to the caller over the established telephone connection. In practice, this may be carried out by specifying a desired time offset to the manager 146, which responds by jumping ahead in the audio segment by the specified time, and starting playback from that point forward. In a different embodiment, the manager 140 uses the original audio segment to generate a new audio segment, truncated by the appropriate time at the beginning, so that playback will synchronize with video play under way.

When the audio segment concludes (as per the table 700), the manager 146 begins playback of the next audio segment precisely at the next planned start time.

Enhanced Services

Optionally, the system 100 may be configured to deliver certain enhanced services. In one embodiment, the enhanced serves include (1) transferring call, and (2) providing enhanced content.

Call Transfer

This feature works as follows, with respect to a given on-site module 120. In step 604, the module 120 autoplays a given video segment as discussed above. As mentioned previously, the display 128 (FIG. 5) includes video content 504 as well as certain call-in instructions 502. In the present example, the call-in instructions 502 (or the video content itself 504) include a message with instructions if the user wishes to be transferred to an operator. The manager 146, in this embodiment, is programmed to recognize when the caller satisfies the transfer instructions, and in that event to transfer the call to a predetermined destination. The transfer instructions and destination number may be specified in the schedule 142, making this information available to the manager 146 to lookup by cross referencing the current time and venue (which was received in step 610).

The call transfer may assist the caller with regard to products in a video segment being played. For example, the call may be transferred to another number where the user can order a pizza, place an order for another product or service, vote on an issue or take a poll, etc. As an example of transfer instructions, during playback of pizza commercial video segment, the message may read "press or say 8 to transfer to DOMINOS™ Pizza."

Enhanced Content

This feature works as follows, with respect to a given on-site module 120. In step 604, the module 120 autoplays a given video segment as discussed above. In the present example, the call-in instructions 502 (or the video content itself 504) include enhanced content instructions for the user to receive enhanced content regarding the video being played. The enhanced content is delivered to the user's telephone 162 in the form of a text message or email. The text or emails messages may contain enhanced content itself, or a link to the same. Some examples of the content include a discount coupon, video segments to supplement the segment being played, an order form, or other information further to the products or information in the video segment being played.

For example, during playback of pizza commercial video segment, the enhanced content instructions may include "press or say 8 for a valuable discount coupon for DOMINOS™ Pizza." Another example, during a car race, is where the message says "press or say 9 to receive a text message link to video from inside Car No. 18."

The manager 146 is programmed to recognize when the caller satisfies the enhanced content instructions, and in that event to send predetermined content to the caller. The content may be specified in the schedule 142, making this information available to the manager 146 to lookup by cross referencing the current time and venue (which was received in step 610).

In one example, the enhanced content video segments, which the user accesses by the link in his/her email or text message, may be hosted at the content server 102. Unlike automatic delivery of video segments 110 to the various on-site modules 120 as discussed so far, the content server 102 makes the enhanced content video segments web accessible. Thus, when a caller receives a text message or email with a web link to enhanced content, the caller can employ his/her Internet capable phone 162 to activate this link and access the requested video content at the server 102. In a different example, the content server 102 transmits the entire video segment (rather than a link to same) to the caller 162, in the form of email, streaming video, or other format.

Timing

One important aspect of the overall operation of the system 100 is the coordination of timing between the modules 102, 120, 140. Although not shown in FIG. 6, each of these modules includes a local clock (not shown), which the module synchronizes to the timer server 150 on a regular basis, either periodically or otherwise. Timing synchronization may occur, for example, on a schedule such as every five seconds. Importantly, repeated time synchronization operations help prevent schedule creep, where over time, various modules 120 might otherwise creep ahead or behind in the local implementation of their schedule with respect to the master schedule 108.

Revenue

Another aspect of running the system 100 involves the opportunities to generate revenue. This may be carried out in a variety of ways, with the following serving as one example. A coordinating entity owns and operates equipment such as 102, 120, and 140. Various other entities own the venues where the on-site modules 120 (and particularly the displays 126) are sited. In one model, the coordinating entity pays some or all of these venues in exchange for placement of the display 126 in the venue. Some venues, though, might not receive any payment.

Another group of entities includes advertisers. The advertisers supply video and audio segments to the coordinating entity, and these are stored in 110 and 112 and distributed as discussed above. The advertisers pay the coordinating entity a fee, royalty, or other type of payment for airing their advertisements.

OTHER EMBODIMENTS

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-driven multimedia content delivery apparatus, comprising
    multiple geographically distributed on-site modules, each said on-site module repeatedly receiving and storing the following from one or more multimedia content servers:
    video segments and schedules dictating times to begin displaying the video segments wherein all video segments scheduled within a predetermined time interval are delivered in a bundle in advance of said predetermined time interval;
    wherein each on-site module automatically displays received video segments at a video monitor according to the respective schedule of said on-site module;
    wherein each on-site module additionally displays call-in instructions including at least an entry code corresponding to said on-site module and a telephone number of an audio server;
    wherein responsive to the audio server, a call placed to one of the telephone numbers is received and a telephone connection is engaged in;
    wherein operations are performed, responsive to receiving user entry of one of the entry codes via the telephone connection, said operations comprising:
    using the received entry code to identify the corresponding on-site module and consulting the schedule specific to the identified on-site module to identify video segment scheduled to be currently playing at the identified on-site module; automatically computing a state of progression of the video; performing one of the following:
        identifying a stored audio segment corresponding to the identified video segment currently playing, said correspondence including a planned synchronization between timing of the video segment to timing of the audio segment, and
        starting delivery of the stored audio segment via the telephone connection such that the audio segment as delivered exhibits the planned synchronization with the video segment;
        identifying a stored audio segment corresponding to a video segment scheduled to play next after the identified video segment currently playing, said correspondence including a planned synchronization between timing of the video segment to timing of the audio segment, and at the start of the video segment scheduled to play next, commencing delivery of the stored audio segment via the telephone connection such that the audio segment as delivered exhibits the planned synchronization with the video segment.

2. The apparatus of claim 1, where the video segments include all of the following: advertisements, trivia, music videos, movie trailers, sporting events, and news stories.

3. The apparatus of claim 1, where each on-site module is programmed with a schedule dictating times to begin displaying the video segments, and the schedules and video segments to be displayed vary among at least some of the on-site modules.

4. The apparatus of claim 1, the audio server further responsive to predetermined caller input during one of the calls to transfer the call to a destination pre-associated with the video segment being played at the on-site module identified by the caller.

5. The apparatus of claim 4, where destinations pre-associated with some of the video segments include telephone lines answered by operators equipped to take a telephone order for a product or service advertised in the video segments.

6. The apparatus of claim 1, the audio server further responsive to predetermined caller input during one of the calls to cause transmittal of the following to the caller: an electronic message of predetermined content associated with the video segment being played at the on-site module identified by the caller.

7. The apparatus of claim 6, the electronic messages occur in at least the following varieties: a text message containing one of the following pre-associated with the video segment being played at the on-site module identified by the caller: a product or service offer, information for ordering a product or service, a discount coupon; a text message containing a link to supplemental, Internet accessible content related to content of the video segment being played at the on-site module identified by the caller.

8. The apparatus of claim 1, the audio server programmed such that the identification of a given on-site module occurs by one of the following: by the audio server receiving a predetermined code identifying the on-site module;
  automatically due to the on-site module being pre-assigned to the telephone number.

9. A method for delivering multimedia content, comprising operations of: each of multiple on-site modules repeatedly receiving and storing the following from one or more multimedia content servers:
  video segments, and schedules dictating times to begin displaying the video segments wherein all video segments scheduled within a predetermined time interval are delivered in a bundle in advance of said predetermined time interval;
  each on-site module automatically displaying received video segments at a video monitor according to the respective schedule of said on-site module;
  each on-site module additionally displaying call-in instructions including at least an entry code corresponding to said on-site module and a telephone number of an audio server;

responsive to the audio server receiving a call placed to one of the telephone numbers, engaging in a telephone connection;

responsive to receiving user entry of one of the entry codes via the telephone connection, performing operations comprising:

using the received entry code to identify the corresponding on-site module and consulting the schedule specific to the identified on-site module to identify video segment scheduled to be currently playing at the identified on-site module;

automatically computing a state of progression of the video;

performing one of the following:

identifying a stored audio segment corresponding to the identified video segment currently playing, said correspondence including a planned synchronization between timing of the video segment to timing of the audio segment, and starting delivery of the stored audio segment via the telephone connection such that the audio segment as delivered exhibits the planned synchronization with the video segment;

identifying a stored audio segment corresponding to a video segment scheduled to play next after the identified video segment currently playing, said correspondence including a planned synchronization between timing of the video segment to timing of the audio segment, and at the start of the video segment scheduled to play next, commencing delivery of the stored audio segment via the telephone connection such that the audio segment as delivered exhibits the planned synchronization with the video segment.

* * * * *